(12) United States Patent
Pervan

(10) Patent No.: US 6,205,639 B1
(45) Date of Patent: Mar. 27, 2001

(54) METHOD FOR MAKING A BUILDING BOARD

(75) Inventor: Darko Pervan, Viken (SE)

(73) Assignee: Valinge Aluminum AB, Viken (SE)

( * ) Notice: Subject to any disclaimer, the term of this patent is extended or adjusted under 35 U.S.C. 154(b) by 0 days.

(21) Appl. No.: 09/323,999

(22) Filed: Jun. 2, 1999

Related U.S. Application Data

(63) Continuation of application No. PCT/SE97/02033, filed on Dec. 5, 1997.

(30) Foreign Application Priority Data

Dec. 5, 1996 (SE) .................................................... 9604484

(51) Int. Cl.[7] .............................. B21D 39/00; B23P 11/00
(52) U.S. Cl. ........................... 29/509; 52/592.1; 52/591.1
(58) Field of Search .................... 29/509, 417; 52/592.1, 52/591.1, 604

(56) References Cited

U.S. PATENT DOCUMENTS

| | | |
|---|---|---|
| 1,986,739 | 1/1935 | Mitte . |
| 1,988,201 | 1/1935 | Hall . |
| 2,276,071 | 3/1942 | Scull . |
| 3,045,294 | 7/1962 | Livezey, Jr. . |
| 3,267,630 | 8/1966 | Omholt . |
| 3,310,919 | 3/1967 | Bue et al. . |
| 3,387,422 | 6/1968 | Wanzer . |
| 3,526,420 | 9/1970 | Brancaleone . |
| 3,694,983 | 10/1972 | Couquet . |
| 3,759,007 | 9/1973 | Thiele . |

(List continued on next page.)

FOREIGN PATENT DOCUMENTS

| | | |
|---|---|---|
| 417526 | 9/1936 | (BE) . |
| 211877 | 10/1940 | (CH) . |
| 1 212 275 | 3/1966 | (DE) . |
| 7102476 | 1/1971 | (DE) . |
| 7402354 | 1/1974 | (DE) . |
| 2 238 660 | 2/1974 | (DE) . |
| 26 16 077 | 10/1977 | (DE) . |
| 29 17 025 | 11/1980 | (DE) . |
| 32 46 376 | 6/1984 | (DE) . |
| 33 43 601 | 6/1985 | (DE) . |
| 86 04 004 | 6/1986 | (DE) . |
| 42 15 273 | 11/1993 | (DE) . |
| 0 248 127 | 12/1987 | (EP) . |
| 843060 | 8/1984 | (FI) . |
| 2630149 | 10/1989 | (FR) . |

(List continued on next page.)

OTHER PUBLICATIONS

Notice of Opposition to European Patent Office dated 06–28–00; Patent No. 0 877 130 B1; Granted Date 01–26–00.

Primary Examiner—S. Thomas Hughes
Assistant Examiner—Jermie E. Cozart
(74) Attorney, Agent, or Firm—Burns, Doane, Swecker & Mathis LLP

(57) ABSTRACT

The invention relates to a method for making a building board 2, exhibiting a board body S which is formed with a gripping stud 24, and a metal strip 10 which extends from the body S and from which are formed gripping elements 26, 28 which are bent round the gripping stud 24 for mechanical fastening of the strip 10 to the body S, as well as locking element 12 for enabling mechanical joining of the board 2 to similar boards. The method is characterized by preforming the gripping elements 26, 28 of the strip 10 prior to bending them round the gripping stud 24, and subsequently bending the preformed gripping elements 26, 28 round the gripping stud 24, the preforming being such that, as a result of the bending, the preformed gripping elements 26, 28 strike against the gripping stud 24 and thereby undergo a deformation in the opposite direction to the preforming during a final stage of the bending.

20 Claims, 5 Drawing Sheets

U.S. PATENT DOCUMENTS

| | | |
|---|---|---|
| 3,859,000 | 1/1975 | Webster . |
| 4,169,688 | 10/1979 | Toshio . |
| 4,426,820 | 1/1984 | Terbrack et al. . |
| 4,501,102 | 2/1985 | Knowles . |
| 4,641,469 | 2/1987 | Wood . |
| 4,738,071 | 4/1988 | Ezard . |
| 4,769,963 | 9/1988 | Meyerson . |
| 4,819,932 | 4/1989 | Trotter, Jr. . |
| 5,029,425 | 7/1991 | Bogataj . |
| 5,179,812 | 1/1993 | Hill . |
| 5,216,861 | 6/1993 | Meyerson . |
| 5,295,341 | 3/1994 | Kajiwara . |
| 5,349,796 | 9/1994 | Meyerson . |
| 5,630,304 | 5/1997 | Austin . |
| 5,706,621 | 1/1998 | Pervan . |
| 5,768,850 | 6/1998 | Chen . |
| 5,797,237 | 8/1998 | Finkell, Jr. . |
| 5,860,267 * | 1/1999 | Pervan ................... 52/748.1 |

FOREIGN PATENT DOCUMENTS

| | | |
|---|---|---|
| 2 675 174 | 10/1992 | (FR) . |
| 2 691 491 | 11/1993 | (FR) . |
| 2697275 | 4/1994 | (FR) . |
| 1127915 | 10/1965 | (GB) . |
| 1237744 | 6/1971 | (GB) . |
| 2117813 | 10/1983 | (GB) . |
| 2243381 | 10/1991 | (GB) . |
| 2 256 023 | 11/1992 | (GB) . |
| 54-65528 | 5/1979 | (JP) . |
| 57-119056 | 6/1982 | (JP) . |
| 3-169967 | 7/1991 | (JP) . |
| 3-169967 | 9/1991 | (JP) . |
| 5-148984 | 6/1993 | (JP) . |
| 7601773 | 2/1976 | (NL) . |
| 372 051 | 12/1974 | (NO) . |
| 157 871 | 2/1988 | (NO) . |
| 450 141 | 6/1987 | (SE) . |
| WO84/02155 | 6/1984 | (WO) . |
| WO93/13280 | 7/1993 | (WO) . |
| WO94/26999 | 11/1994 | (WO) . |

* cited by examiner

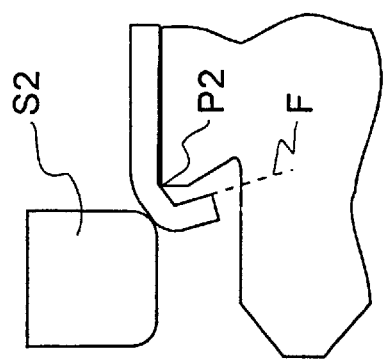
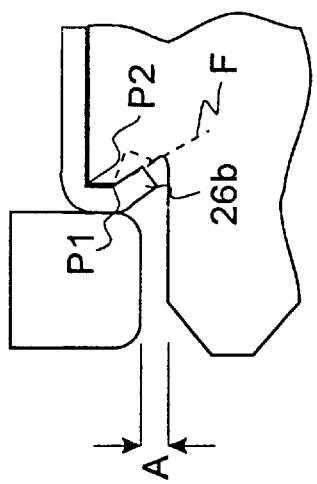
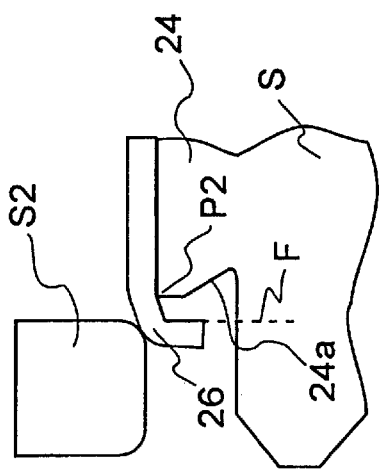
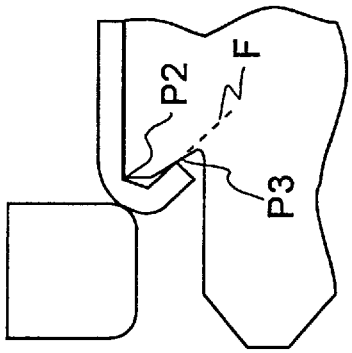
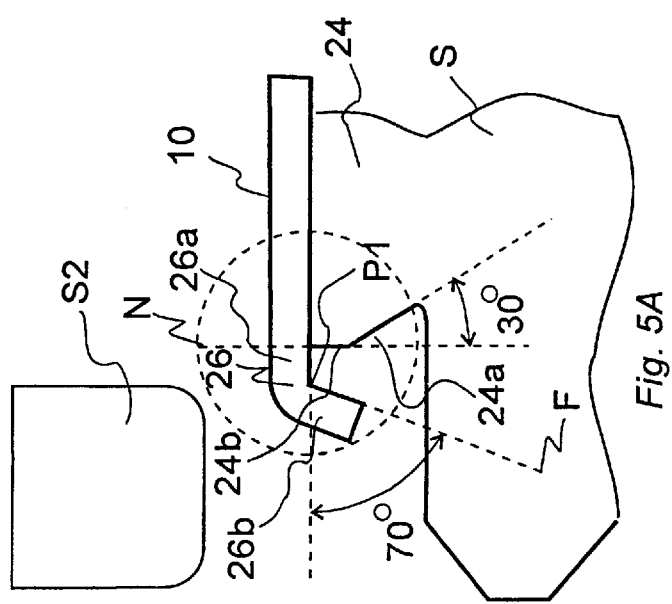
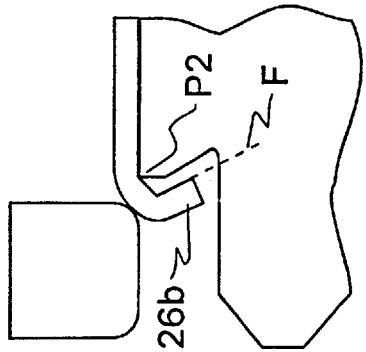

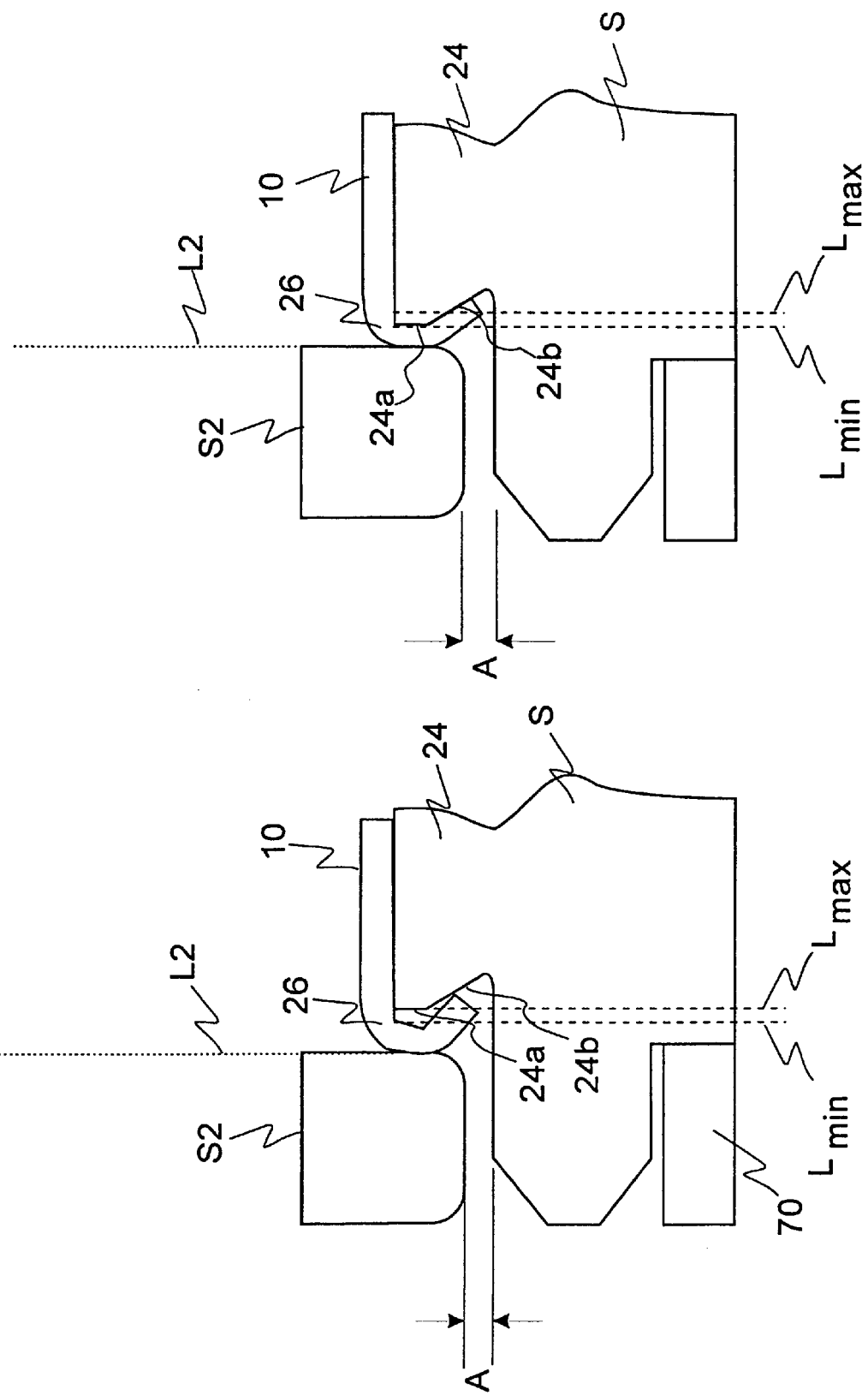

METHOD FOR MAKING A BUILDING BOARD

This is a continuation of International Application No. PCT/SE97/02033, filed Dec. 5, 1997, that designates the United States of America and which claims priority from Swedish Application No. 9604484-7, filed Dec. 5, 1996.

FIELD OF THE INVENTION

The present invention generally relates to a method for making a building board, such as a floorboard, which board is intended to be mechanically joined to similar building boards and which board comprises a board body as well as, for the mechanical joining, a metal strip which is mechanically connected to, and projects from, the board body and which is formed with a locking element intended to engage with a complementary locking groove of an adjoining building board.

More specifically, the invention relates to an improved technique for the mechanical connection between the metal strip and the body.

BACKGROUND, FEATURES AND ADVANTAGES OF THE INVENTION

A building board, for example a floorboard, provided with a projecting metal strip formed with a locking element for mechanical joining is described in WO 94/26999. The content of that document shall be considered to be part of the present description, and provides a more detailed description of how such building boards can be designed and joined together. The background, features and advantages of the invention will be described specifically for this known type of floorboard, but it should be emphasised that the invention is useful for making building board types other than floorboards, such as wall panels and roof slabs. All references to the term "floor-board" should therefore be considered to apply to building boards in general.

WO 94/26999 thus discloses a system for mechanical joining of floorboards. A first mechanical connection provides mutual vertical locking of the joint edges and may be in the form of a tongue-and-groove joint along the joint. A second municipal connection provides mutual horizontal locking of the boards in a direction at right angles to the joint edges of the boards.

In order to illustrate the situation upon which the present invention is based, reference is now made to FIG. 1, which shows in section a joint between two identical mechanically joined floorboards 2. The method according to the invention is useful for making such floorboards. The design and the function of the floor-boards 2 substantially correspond to what is known from WO 94/26999. However, there are certain differences compared to the prior art with respect to the geometrical shapes of a gripping stud and a locking element.

Each board 2 has a top side 4 and underside 6 and, for illustration purposes, can be assumed to be made of a board body S of laminated fibreboard, plastic composite, wood or the like. The thickness of the body S can, for example, be 7 mm. To enable a mechanical connection, opposite joint edges 8 of the boards 2 are formed with an integrated metal strip 10 mounted at the factory, as well as a locking groove 16. The strip 10 is preferably made of sheet aluminium and extends horizontally from the underside 6 of the board 2 in the direction of the second floorboard and runs continuously throughout the entire length of the joint. However, the strip 10 can be divided into smaller parts, which cover the main portion of the length of the joint.

In order to achieve the required joint tolerances as well as simple laying, the strip 10 is integrally formed with the board, i.e. it is mounted at the factory and should specifically not be mounted in connection with laying. As a non-restrictive example, the strip 10 may have a width of about 30 mm and a thickness of about 0.6 mm. Metal sheet materials other than aluminium could also be used.

Along its one side edge, the strip 10 is formed with a locking element 12, bent from the sheet material, which exhibits an active locking surface 14 having a height of e.g. 1.0 mm. In the joined state, the locking element 12 is received in a locking groove 16, formed in the underside 6 of the second board and extending parallel to and spaced from the joint edge 8. The locking element 12 and the locking groove 16 together form the above-mentioned second mechanical connection, locking the boards 2 to each other in the direction designated D2. More specifically, the locking surface 14 of the locking element 12 serves as a stop with respect to the surface 18 of the locking groove 16 closest to the joint edges 8.

When the boards 2 are joined together according to FIG. 1, they can occupy a relative position in the direction D2 where a small play Δ, as small as 0.01 mm, exists between the locking surface 14 and the locking groove 16. This play makes it possible to displace the boards 2 in the direction of the joint without the use of tools. This displaceability facilities the laying and enables joining together the short sides by snap action. Reference is made to WO 94/26999 for a more detailed description of the function and advantages of this construction.

The strip 10 is mounted in a tolerance-equalising groove in the underside 6 of the board 2. In this embodiment, the width of the equalising groove is approximately equal to half the width of the strip 10, i.e. about 15 mm. The functioning of and different ways of forming the equalising groove are described in detail in WO 94/26999 and, consequently, need not be repeated here.

The strip 10 is mechanically fitted to the body S in the following manner. A groove 20 is provided in the underside 6 of the body S at a distance from a recess 22 adjacent to the joint edge 8. The groove 20 may be formed either as a continuous groove extending throughout the entire length of the body S, or as a number of separate grooves. Together with the recess 22, this groove 20 defines a dove-tail gripping stud 24 of the body S. In its fastened state in FIG. 1, the strip 10 exhibits a number of punched and bent tongues 26 as well as one or more lips 28, which are bent round opposite sides of the gripping stud 24. The term "gripping element" will be used in the following as a general term for tongues, lips and corresponding components of the strip which are formed from the sheet material and bent round the gripping stud 24 of the body S.

SUMMARY OF THE INVENTION

A main object of the invention is to provide a technique for improving building boards of the type mentioned above.

A particular object of the invention is to provide a technique for improving the mechanical fastening of the strip to the body.

It is also an object of the invention to provide a technique for improving a manufacturing method for building boards of the type mentioned above.

For achieving these and other objects, according to the invention a method is provided for making a building board having the features recited in the appended claims.

Thus, the invention provides a method for making a building board, which exhibits a board body formed with a gripping stud, and a metal strip extending from the body, from which are formed gripping elements which are bent round the gripping stud for mechanical fastening of the strip to the body, as well as a locking element for enabling mechanical joining of the board to similar boards. The method is characterized by preforming the gripping elements of the strip prior to bending them round the gripping stud, and subsequently bending the preformed gripping elements round the gripping stud, the preforming being such that, as a result of the bending, the preformed gripping elements strike against the gripping stud and thereby undergo a deformation in the opposite direction to the preforming in a final stage of the bending.

The preforming which occurs during said final stage of the bending preferably results in a biasing of the gripping elements of the strip against the gripping stud.

The preforming as well as the bending of the gripping elements are preferably carried out by means of punching means operating essentially at right angles to a principal plane of the strip/building board, and, in a particularly preferred embodiment, such punching means are arranged in one and the same punching tool so that they are stationary in relation of each other during the preforming and the bending.

For achieving good fastening, and for eliminating tolerance problems, the gripping elements are preferably preformed to such an extent that said deformation which arises during the final stage of the bending consists of a permanent reverse bending of the gripping elements as well as a resilient return of the gripping elements. In this connection, the reverse bending can compensate for tolerances with respect to, for example, the position of the gripping stud in relation to the board body or in relation to bending punching means, while a biasing force which is achieved by the resilient return can be kept essentially constant.

As is already known per se from the aformentioned WO 94/26999, the gripping stud is preferably provided with undercut gripping edges round which bending is carried out. A particularly strong gripping stud, suitable for the biasing technique according to the invention, can be obtained if the gripping edges of the gripping stud are formed with first non-undercut gripping edge parts closest to the strip and second undercut gripping edge parts adjacent thereto. During the bending, the non-undercut gripping edges achieve a reinforcement of the gripping stud, while the preformed gripping elements are biased essentially only against the undercut gripping edge parts.

Undercut gripping edges of the gripping stud preferably exhibit an undercutting angle of 10°–45° in relation to the normal to a principal plane of the building board, and the gripping elements are preferably preformed with a preforming angle of 15°–90° in relation to a principal plane of the strip. However, for achieving the biasing, the undercutting angle should be smaller than the preforming angle, and preferably so much smaller that, even in the case of deviations due to tolerance in the position of the gripping stud, a permanent reverse bending of the gripping elements as well as a resilient return thereof are always obtained. A return angle in the order of 45° has been found suitable.

In a preferred embodiment, the preforming is achieved by bending each gripping element through a predetermined pre-bending angle at a first point spaced from a free end of the gripping element, and the bending is achieved by bending the gripping element thus preformed at a second point, which is located farther away from said free end than the first point. Specifically, the pre-bending can be performed against a punch die separate from the gripping stud, while the bending is not carried out until the strip has been positioned against the gripping stud, which in this connection serves as a punch die.

These and other embodiments of the invention will appear from the appended claims and the following description of preferred embodiments.

By the biasing technique according to the invention with preforming and bending, several advantages are achieved from a manufacturing as well as a product point of view:

1. The board body, which is typically made of wood or a wood-based material, or of plastic, may change its dimensions in connection with variations in moisture and temperature, while the metal strip is temperature-sensitive only. Such dimensional changes of the body and/or the metal strip may have a negative impact on the mechanical connection between the body and the strip, and may specifically result in undesired joint gaps between the boards as well as poor strength.

A first advantage of the invention is that it ensures that such dimensional changes of the body and/or the strip do not impair the mechanical connection, since, according to the invention, the mechanical connection between the strip and the board body can be biased and, consequently, can automatically and continuously adjust to every dimensional change of these two components. In this way, it is ensured that the strip is always firmly and securely connected to the board body, so that the relative position of these two components remains correct and unchanged. By the invention, strips which are loose and can be displayed relative to the board body are thus avoided and, consequently, undesired joint gaps and poor strength due to loosely attached strips are eliminated.

2. In addition to the above-mentioned environmentally-caused dimensional variations of the finished building board, a variation can also occur in the position of the gripping stud in relation to the board body. This positional variation is due to tolerances in the manufacturing of the gripping stud, especially if its gripping edges are formed by milling. As a result of these tolerances, the position of the gripping edges in relation to the joint edge of the body may vary somewhat (e.g. in the order of ±0.05 mm) from one building board to another. If the strip is positioned in relation to the gripping stud at the time of manufacturing, this positional variation of the gripping edges may result in the strip being positioned incorrectly.

A second advantage of the invention is that the preforming in combination with reverse bending and biasing compensates for the above-mentioned positional variation of the gripping edge, since an "in-correct" position of the gripping edges can be compensated for by the fact that the gripping elements of the strip can be caused always to strike against the gripping edges during bending and be reverse bent to different extents, depending upon the position of the corresponding gripping edge.

Generally, in manufacturing, it is desirable to be able to operate within the largest possible tolerance, since this reduces set-up and take-down times, checks, and tool grinding. In the present case, a suitably designed preforming can handle tolerances of e.g. 0.15 mm.

3. A third advantage provided by the invention is that, by virtue of being preformed, the gripping elements of the strip can always be moved to the correct position in relation to the bending punches and still strike against and be reverse bent by the gripping stud which is positioned within a certain manufacturing tolerance in relation to the bending punches. This advantage means that even if the relative position between the gripping edges of the body and the bending punches should vary somewhat between different punching operations, this does not have a negative effect on the quality of the mechanical connection between the strip and the board body.

4. A further advantage achieved by the invention is that the biasing force applied to the gripping stud by the bent gripping elements of the mechanically attached strip is essentially independent of both the punching force which is applied by means of the bending punches and the length of stroke of the bending punches. The advantage of this is that (i) the bending punches and (ii) other punches required for making the floorboard (such as pre-bending punches, punching machines, etc) can be mounted in one and the same punching tool, which during manufacturing moves to-and-fro with a length of stroke common to all punches and a common pressing power. Specifically, this makes it possible to allow the bending punches, when they are moving in the direction of the strip, to continue a distance past the point in the punching motion at which the fastening of the strip to the board body is completed, enabling the other punches to complete their punching function during a final, inactive motion of the bending punches.

The biasing force can be controlled with the aid of parameters of the metal strip (sheet thickness, alloy, etc.), as well as with the aid of the position angle, and length of the preformed gripping elements in relation to the gripping edges and the undercut of the same, and with the aid of the relative position of the gripping edges and the bending punches.

5. The forming of the locking element of the strip is preferably carried out by means of punches operating essentially at right angles to the principal plane of the floorboard, and, as mentioned above, it is an advantage if all punching operations can be carried out with one and the same punching tool. Consequently, it is desirable that the fastening of the strip can also be carried out by means of punches operating at right angles to the principal plane of the floorboard. A further advantage of the invention is that the preforming makes this possible, since the preforming means that the punching equipment need not include bending punches operating from the side for fastening the strip to the gripping stud.

Another advantage of bending punches operating at right angles is that the compression pressure on the same can be optionally very high with no risk of the gripping stud breaking, while the fastening force against the gripping stud can be exactly controlled by the deformation of the strip. Whereas, if the bending punches had been operating towards the edges of the gripping stud, whose position varies in such a punching direction because of the aforementioned manufacturing tolerances, the pressure on the gripping stud would have varied considerably, with the risk of the gripping stud breaking or the fastening of the strip being loose.

6. A further advantage of the invention is that the preforming makes it possible to reduce the thickness of the board body and, consequently, of the finished building board, by virtue of the fact that the height of the gripping stud can be reduced since the gripping elements of the strip, which are to be bent round the gripping stud, are preformed when the bending is carried out.

BRIEF DESCRIPTION OF THE DRAWINGS

FIGS. 5A–5F illustrate preforming, bending and reverse bending according to the invention.

FIGS. 6A and 6B illustrate the advantage of the invention when there are tolerances with respect to the position of the gripping stud in relation to the board body.

DESCRIPTION OF AN EMBODIMENT

Figure 1:
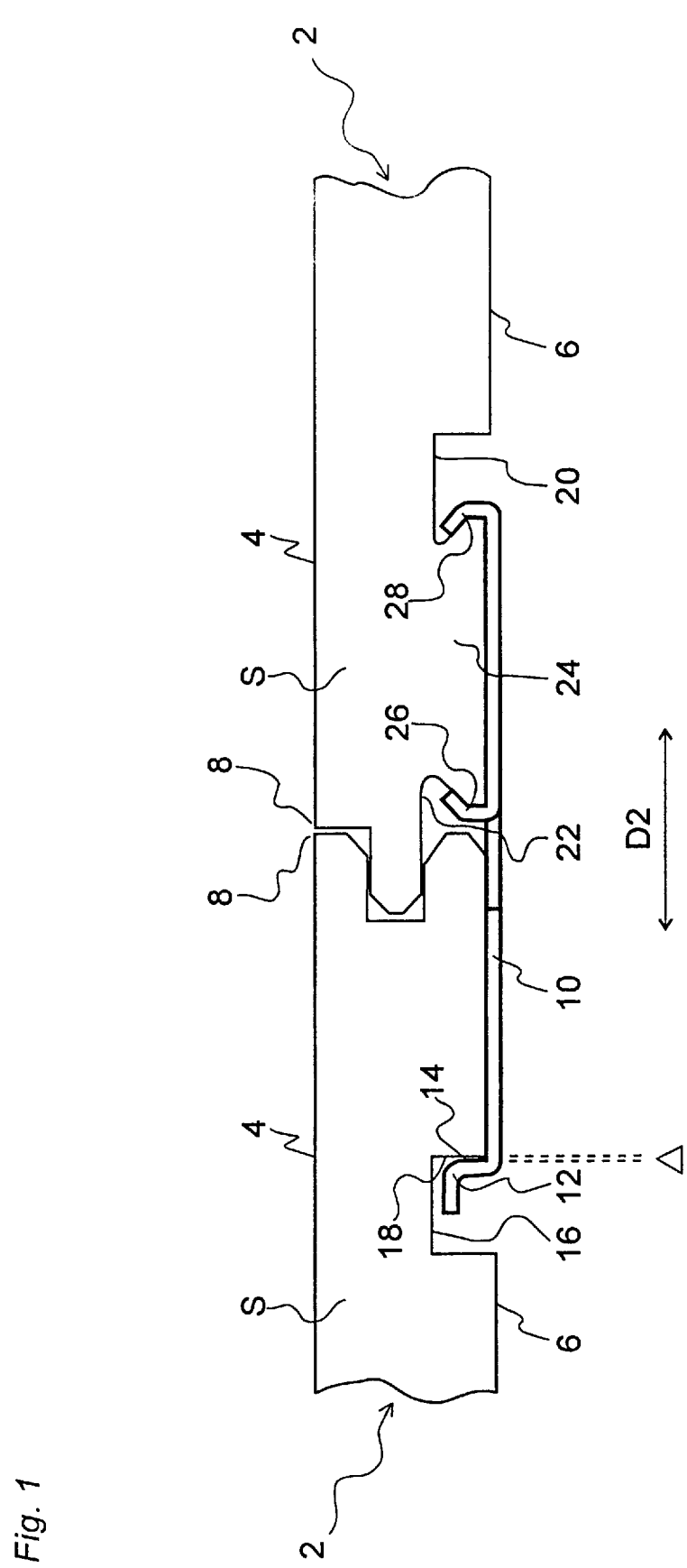
FIG. 1 shows in section two mechanically joined edge portions of two identical floorboards.

With reference to FIGS. 2–6 in the appended drawings, a production line will now be described, which is usable for making building boards, such as floorboards, of the type mentioned above with reference to FIG. 1 and in which production line an embodiment of the method according to the invention is implemented. The same reference symbols as in FIG. 1 will be used for the components of the floorboard.

Figure 2:
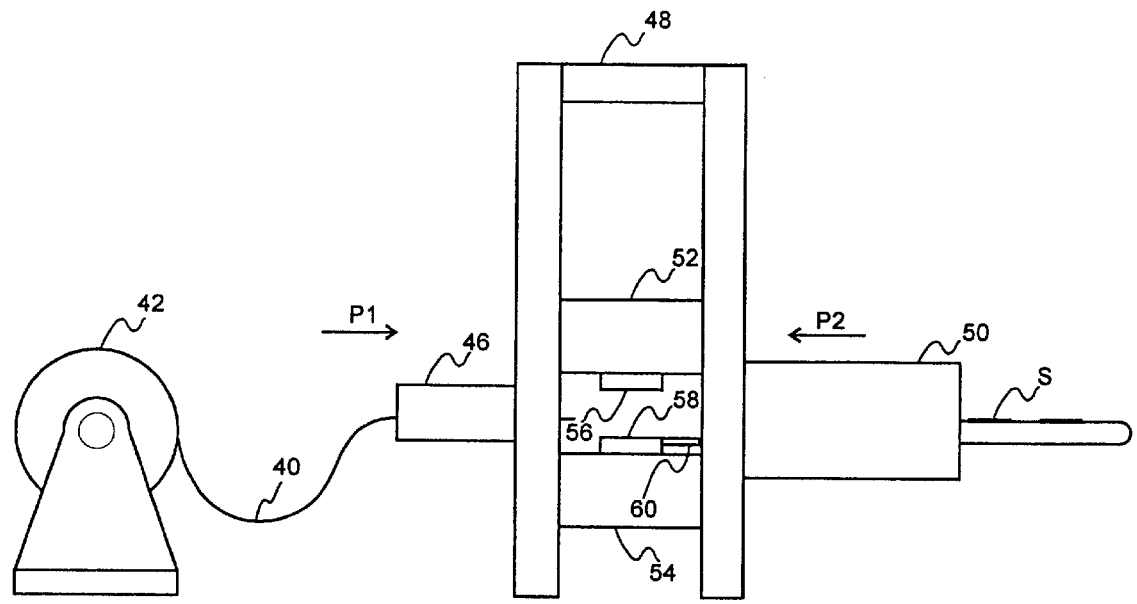
FIG. 2 is an overall view of a production line for making floorboards according to the invention.

In FIG. 2, a flexible, formable blank 40, preferably aluminium sheet, is would onto a reel 42. The aluminium sheet 40 is fed from the reel 42 to a sheet feeder 46. The task of the sheet feeder 46 is gradually to feed (arrow P1) the flat blank 40 into a press 48. On its opposite side, the press 48 (arrow P2) receives machined (milled) bodies S of e.g. compact laminate from a board feeder 50.

In the production line in FIG. 2, the blank 40 is cut into separate metal strips 10, the locking elements 12 of the strips 10 are formed, and the strips 10 are mechanically attached to board bodies S by means of gripping elements which are formed from the metal strips.

Figure 3:
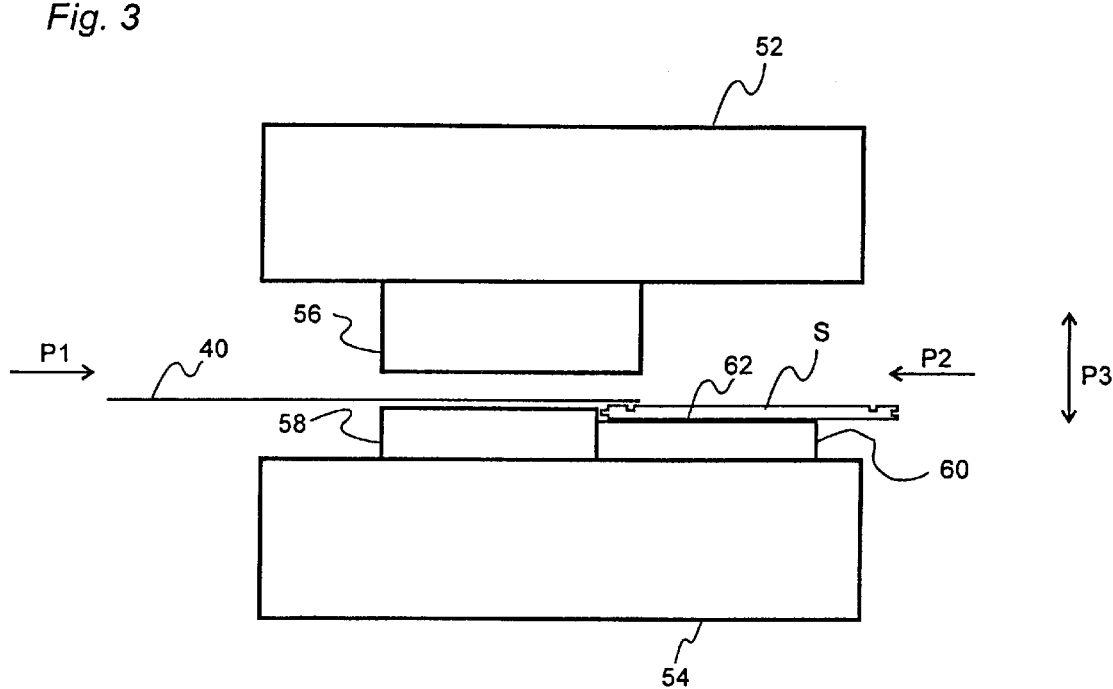
FIG. 3 shows the central portion of a press forming part of the production line in FIG. 2.

FIG. 3 schematically shows a central part of the press 48. An upper press table 52 supports a punch holder 56, and a lower press table 54 supports an associated die cushion 58 as well as a tool table 60 adjacent to the die cushion 58, which table forms an upper support surface 62 (see FIG. 4) for the body S. The two press tables 52 and 54 are movable in relation to each other in the direction indicated by the arrow P3.

Figure 4A:
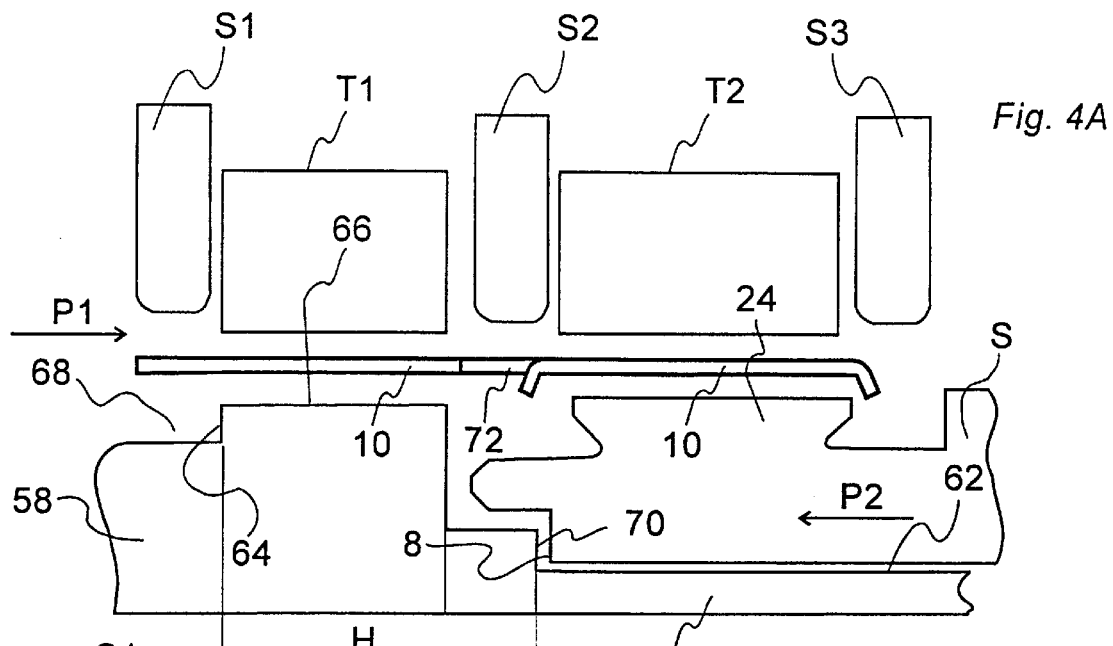
FIGS. 4A–4C show three consecutive operational steps in an operating cycle of the press in FIG. 3.
Figure 4B:
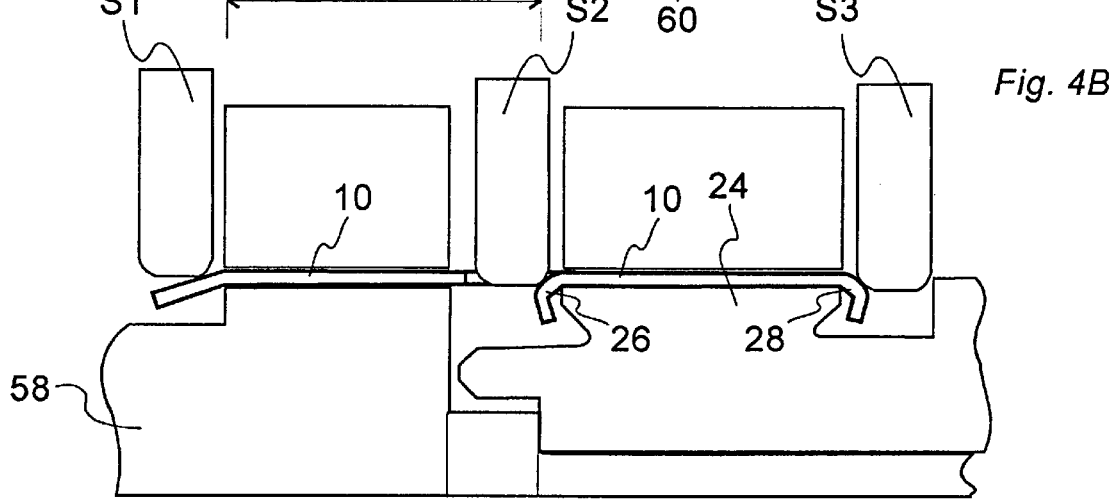
Figure 4C:
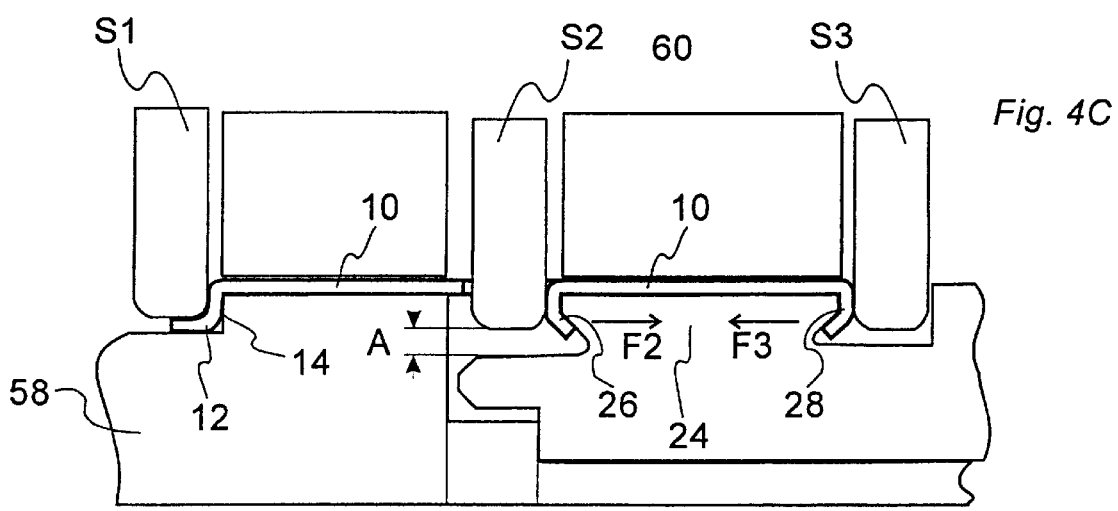

FIGS. 4A–C show the parts which are central to (i) the forming of the locking element 12 of the strip 10 and (ii) the mechanical attachment of the strip 10 to the body S.

FIGS. 4A–C show the die cushion 58 and the tool table 60 on a larger scale. In its top side, the die cushion 58 has a forming surface 64 against which the locking element 12 of the strip 10 is formed, as well as a holding surface 66. The forming surface 64 is formed by two partial surfaces of a groove 68 formed with great precision in the die cushion 58 and extending perpendicular to the plane of the drawing along the entire width of the blank 40. The tool table 60 has stop edges 70 which extends transversely of the insertion direction P2 and against which a predetermined portion of the body S is caused to abut when the body S is fed into the press 48. In the preferred embodiment, said predetermined portion consists of the upper joint edge 8 of the body S. The stop edge 70 is to serve as a reference surface and, for this purpose it has an exact, predetermined position in relation to the forming surface 64 corresponding to a desired position of the upper joint edge 8 of the body S in relation to the locking surface 14. The forming surface 64 and the reference surface 70 together function as a "template" against which the locking surface 14 and the upper joint edge 8, respectively, are positioned for achieving good tolerance values in the finished building board.

Three punches S1, S2, and S3 are shown above the die cushion 58 and the tool table 60. In the embodiment shown, these punches operate in unison in relation to the die cushion 58, i.e. they are mutually stationary. Moreover, two vertically operating holding-down means T1 and T2, separate from the punches S1–S3, are shown. The punches S1–S3 and the holding-down means T1 and T2 are extended over the entire width of the blank 40. However, S2 is constructed from a plurality of mutually separate modules.

The first punch S1 forms the locking surface 14 of the locking element 12 against the forming surface 64. The second punch S2 and the third punch S3 serve to band the tongues 26 and the lip 28 round the gripping stud 24 of the body S in order mechanically to attach the strip 10 to the body S. As mentioned above, the second punch S2 is constructed from modules, each module serving to bend a corresponding tongue 26 and having a width of e.g. 10 mm. To enable the punch S1 to carry out the bending of the lip 28, the latter is preformed in the blank 40 upstream in the production line, and to enable the punch S2 to carry out said bending of the tongues 26, the latter are preformed in the blank 40 upstream in the production line, so that there are openings 72 in the blank 40 for receiving the second punch S2.

An operating cycle of the production line described above will now be described in more detail. First, the part of the blank 40 which is to form the strip 10 is gradually fed over the die cushion 58. During the feeding, the lip 28 and the tongues 26 are preformed and the strip 10 is still integral with the rest of the blank 40. A certain partial separation may nevertheless have taken place earlier, but in any case, in this feeding step, the strip 10 is not handled as a separate unit. Substantially simultaneously, a body S is fed over the tool table 60 and is positioned with its upper joint edge 8 abutting against the reference surface 70.

Subsequently, the holding-down means T1 and T2 are activated to the holding position shown in FIG. 4B. T1 fixes the strip 10 relative to the die cushion 58. T2 fixes the strip relative to the underside 6 of the body S and fixes the body S relative to the tool table 60 and, consequently, also relative to the reference surface 70. T1 and T2 are maintained in this holding position until the locking element 12 has been formed and the strip 10 has been mechanically fastened to the body S.

In the next step, the punches S1–S3 are activated in unison according to FIGS. 4B and 4C, so that (i) the locking surface 14 of the locking element 12 is formed against the forming surface 64, (ii) the strip is separated from the blank 40 by being cut off with e.g. a punch, and (iii) the strip is fastened to the body S. These three operations thus take place substantially simultaneously. In order to ensure that S1 "bottoms" against the groove 68, the punches S2 and S3 move somewhat ahead of S1. In this way, subsequent to completing their bending of the tongues 24 and the lip 28, the punches S2 and S3 can continue an extra distance during the final forming of the locking element 12 by means of the punch S1. All punching operations (cutting, forming, bending) are finished when S1 reaches its bottom position against the forming surface 64.

As mentioned above, the tongues 26 and the lip 28 are preformed. Prior to positioning and fixing the strip 10 by means of the holding-down means T1 and T2, both the tongues 26 and the lip 28 are pre-bent to the position shown in FIG. 4A. The pre-bending of the tongues 26 as well as of the lip 28 is achieved in prior manufacturing steps (not shown). When the punches S2 and S3 are activated (FIGS. 4B and 4C), a second bending takes place round the gripping stud 24. In this connection, the pre-bent portion will undergo a certain reverse bending, resulting in a bias arising in the tongues 26 as well as in the lip 28.

FIGS. 5A–5F show in more detail the fastening of a tongue 26 to the gripping stud 24. The same technique is used for the lip 28 and will consequently not be described. The undercutting angles and preforming angles can be the same on both sides of the gripping stud 24 or, alternatively, they can be different, The gripping edge of the gripping stud 24 round which the tongue 26 is bent exhibits an undercut gripping edge part 24a, which forms an undercutting angle of about 30° in relation to a normal N to the principal plane of the strip 10, and a non-undercut gripping edge part 24b parallel to the normal N, which provides a reinforcement of the end portion of the gripping edge 24 in connection with the bending.

FIG. 5A shows how the tongue 26 has already been preformed, when the strip 10 is positioned on the gripping stud 24. An outer part 26b of the tongue 26 has been pre-bent downwards (by means of a pre-bending punch (not shown) upstream in the production line) at a pre-bending angle of about 70° in relation to the principal plane of the strip 10, round a point P1 which is spaced from the gripping stud 24. In FIG. 5A, a line P indicates the direction of the pre-bent outer part 26b. A non-preformed inner part 26a of the tongue 26 is extended from the gripping stud 24 to the point P1.

Alternatively, the preforming of the gripping elements of the strip can be performed in several sub-steps, and the preforming can be achieved by bending as in this case, and/or by a more continuous bending of the gripping elements. The outer part as well as the inner part can be preformed, and a defined bending point between the inner part and the outer part is not necessary.

FIG. 5B shows how the bending punch S2 has been caused to contact the tongue 26 and has begun the bending round the gripping stud 24 at a point P2. In this connection, the direction of the preformed outer part 26b essentially coincides with the normal N, as indicated by the line P.

FIGS. 5C and 5D show how, during continued bending round the point P2, the line of direction P subsequently passes the normal N, the outer part 26b of the tongue 26 coming closer and closer to the undercut gripping edge part 24a.

In FIG. 5E, the extremity of the outer part 26b of the tongue 26 has just struck against the undercut gripping edge part 24a of the gripping stud 24 at a point P3.

During the final bending round the point P2 from the state in FIG. 5E to the state in FIG. 5F, the outer part 26b of the tongue 26 is prevented from penetrating into the gripping and stud 24 to the position indicated by dashed lines, which illustrates the original pre-bending angle. Instead, the outer part 26b is forced to reverse bend round the point P1 in a clockwise direction in the FIGS., i.e. opposite to the bending direction round the point P2. In the embodiment shown, the outer part 26b is reverse bent through a reverse bending angle of about 40° (70°–30°). This reverse bending is so great that it consists of both a permanent reverse bending (for example in the order of 39°) and a resilient return (for example in the order of 1°). By virtue of the fact that part of the return is resilient, a bias is obtained between the tongue 26 and the gripping stud 24.

Using present day technology, the tolerance when machining the body S is in the order of 0.02–0.03 mm, and, in addition, machining tools wear more than punching tools, which means that, in practice, the dimensional accuracy when machining the body S can amount to ±0.05 mm. Consequently, the relative position of the bending punches and the corresponding gripping edges of the gripping stud 24 may vary. FIGS. 6A and 6B illustrate how this positional tolerance of the gripping stud is compensated for by the invention. In this connection, it should be noted that, for several reasons, it may be advantageous from a production point of view to work with large tolerances.

FIGS. 6A and 6B correspond to the final state in FIG. 5F and show the result after finished bending in two extreme cases. In FIG. 6A, as a result of machining tolerances, the left gripping edge of the gripping stud 24 lies displayed maximally from the punch S2. The position of the gripping edge is indicated by a line Lmax and the position of the punch S2 is indicated by a line L2. In FIG. 6B, as a result of machining tolerances, the same gripping edge is instead displaced minimally from the punch S2. In this Figure, a line Lmin indicates the position of the gripping edge.

By virtue of the preforming and the return according to the invention, a secure mechanical connection is obtained in both of these extreme cases. In the situation in FIG. 6A, the outer part 26b of the tongue 26 is reverse bent somewhat less compared to the situation in FIG. 6B. However, in both cases, the total reverse banding angle is large enough for the resilient return angle to be equally large in both cases, i.e. the size of the biasing force is not affected by the positional tolerances of the gripping edge.

In FIG. 5A, a circle C is drawn, whose center coincides with the bending point P2 and whose radius corresponds to a maximum distance from the point P2 to the tip of the outer part 26b. During the bending in steps 5B–5E, the outer part of the tongue 26 moves inside this circle C. Since the radius of the circle C decreases when the pre-bending angle increases, it will be appreciated that the thickness of the body S and, consequently, of the finished building board 2 can be reduced by virtue of the preforming, since the depth of the recesses 20 and 22 in the underside 6 of the body S can be reduced.

As shown in FIG. 4C, the underside of the bending punches S2 and S3 are located at a distance "A" from the board body S at the moment when the bending operation is completed. By virtue of this distance "A", it is ensured that the final forming of the locking element 12 in FIG. 4C can certainly be completed by the punch S1 bottoming against the die cushion 58.

Since the lip 28 extends continuously along the entire length of the strip 10, while the tongues 26 are located at a distance from each other in the longitudinal direction of the strip 10, the pressure on the lip 28 exerted by the punch S3 will be greater than the pressure on the tongue 26 exerted by the punch S2. The horizontal force F3 generated by S3 will thus be greater than the opposed force F2 exerted by the punch S2. The effect of this force differential (F3-F2) is that a possible "banana shape" of the body S, which could give rise to and undesired gap in the joint between two interconnected boards, is straightened out by the board being pressed against the stop edge 70 of the tool table 60.

The embodiment described above can be varied in several ways within the scope of the appended claims. For example, the parts of the locking elements 26, 28 which in the embodiment lie horizontally prior to the bending, can instead be bent downwards somewhat when the bending starts. Moreover, the undercut edge can be designed in ways other than those described above, for example with a stepped shape. As an alternative, the gripping edge can be non-undercut, in which case the fastening is effected by frictional force only and/or penetration into the gripping stud.

What is claimed is:

1. A method for making a building board, said building board including:
    a board body in which a gripping stud is formed, and
    a metal strip which extends from said board body, the metal strip including gripping elements which are bent around the gripping stud for mechanical fastening of the metal strip to the board body, as well as a locking element to enable mechanical joining of said board to similar boards,
    said method comprising the following steps:
        preforming the gripping elements of the metal strip prior to bending the gripping elements around the gripping stud, and
        subsequently bending the preformed gripping elements around the gripping stud in a bending step,
        the preforming being such that, as a result of the bending, the preformed gripping elements strike against the gripping stud and thereby undergo a deformation in an opposite direction to the preforming during a final stage of the bending step.

2. The method as claimed in claim 1, wherein said deformation that occurs during said final stage of the bending step results in a biasing of the gripping elements of the strip against the gripping stud.

3. The method as claimed in claim 2, wherein the strip is made of a resilient material.

4. The method as claimed in claim 1, wherein the strip is made of a resilient material.

5. The method as claimed in claim 1, wherein the step of bending of the gripping elements is carried out with the aid of punching means operating essentially at right angles to a principal plane of the building board.

6. The method as claimed in claim 5, wherein said punching means for carrying out the preforming step and said punching means for carrying out the bending step are arranged in one and the same punching tool and are stationary in relation to each other during the preforming and bending steps.

7. The method as claimed in claim 1, wherein the step of preforming the gripping elements of the strip is carried out with the aid of punching means operating essentially at right angles to a principal plane of the strip.

8. The method as claimed in claim 7, wherein said punching means for carrying out the preforming step and said punching means for carrying out the bending step are arranged in one and the same punching tool and are stationary in relation to each other during the preforming and bending steps.

9. The method as claimed in claim 1, wherein said deformation that occurs during the final state of the bending step consists of a permanent reverse bending as well as a resilient return of the gripping elements.

10. The method as claimed in claim 1, said gripping stud presenting a positional tolerance range, wherein the gripping elements are preformed to an extent which is so adjusted to said positional tolerance range that said biasing is obtained over the entire positional tolerance range.

11. The method as claimed in claim 1, wherein the gripping stud is provided with undercut gripping edge parts.

12. The method as claimed in claim 11, wherein the undercut gripping edge parts of the gripping stud exhibit an undercutting angle of 10°–45° in relation to a normal to a principal plane of the building board.

13. The method as claimed in claim 1, wherein the gripping stud is provided with nonundercut gripping edge parts closest to the strip as well as undercut gripping edge parts adjacent thereto.

14. The method as claimed in claim 13, wherein the undercut gripping edge parts of the gripping stud exhibit an undercutting angle of 10°–45° in relation to a normal to a principal plane of the building board.

15. The method as claimed in claim 1, wherein the gripping elements of the strip are preformed during said preforming step to a preforming angle of 15°–90° relative to a principal plane of the strip.

16. The method as claimed in claim 1, wherein the gripping stud is provided with undercut gripping edge parts exhibiting an undercutting angle in relation to a normal to a principal plane of the building board, and wherein the gripping elements are preformed during said preforming step through a preforming angle relative to a principal plane of the strip which is greater than said undercutting angle.

17. The method as claimed in claim 1, wherein the preforming step is performed by pre-bending each gripping element through a predetermined pre-bending angle at a first point spaced from a free end of the gripping element, and wherein the bending step is performed by bending the gripping element thus preformed around a second point, which is located farther away from said free end than the first point.

18. The method as claimed in claim 17, wherein said second point, around which the bending is carried out, is defined by the gripping stud.

19. The method as claimed in claim 1, wherein the strip is first moved to a first punch position where the preforming step is carried out, and subsequently is moved to a second punch position in which the bending step is carried out.

20. The method as claimed in claim 1, wherein the strip and the body are not moved together until after the preforming step is completed.

* * * * *